Feb. 19, 1946. F. L. HILL ET AL 2,395,273
HOSE CLAMP
Filed Aug. 17, 1944 2 Sheets-Sheet 1
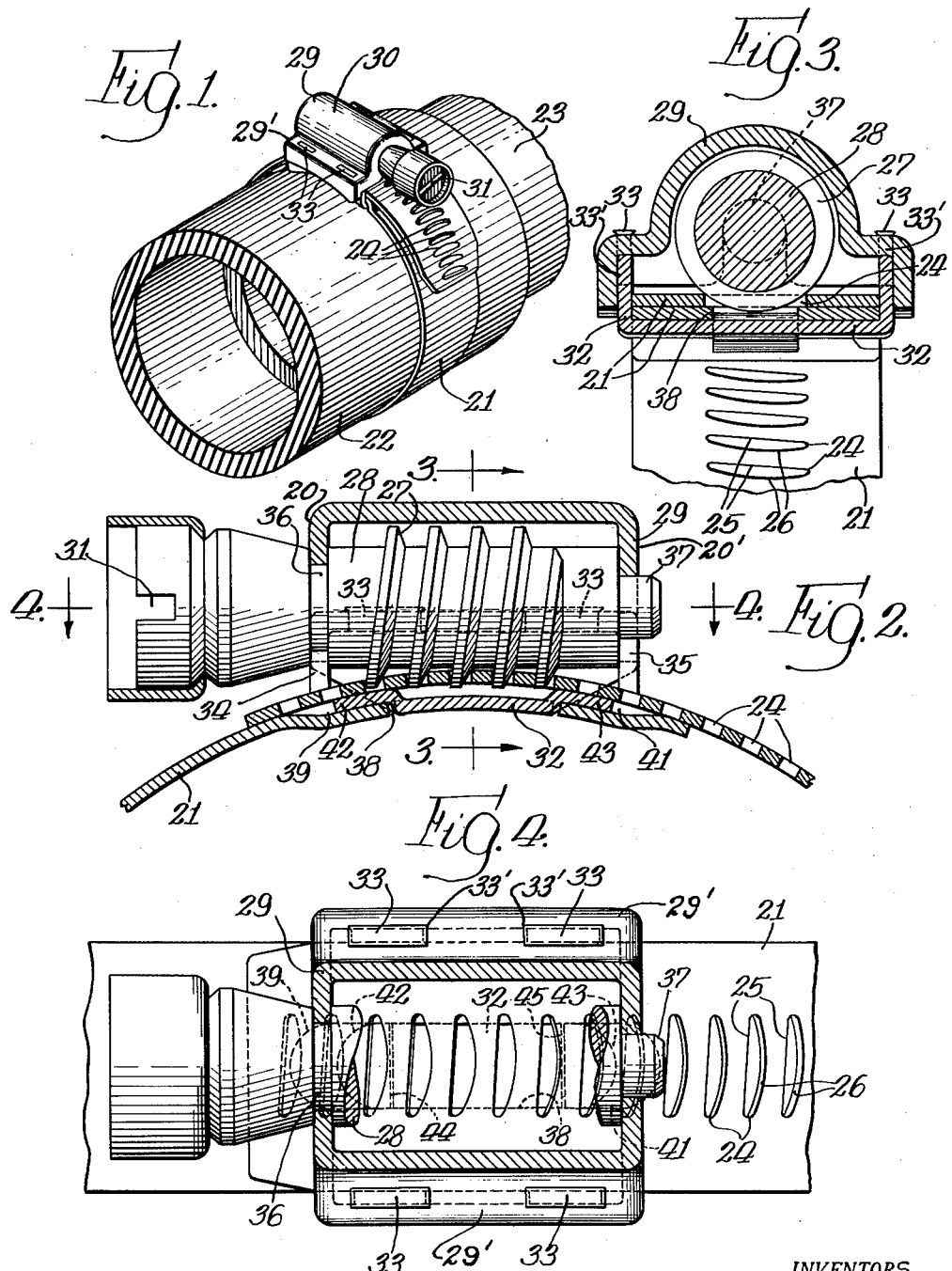
INVENTORS.
Frank L. Hill.
Keith A. Hill,
BY
Cha J Wilson
Atty.

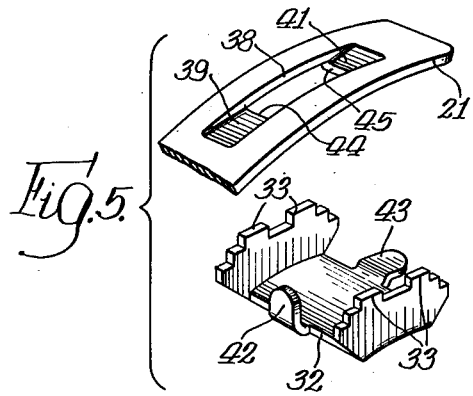
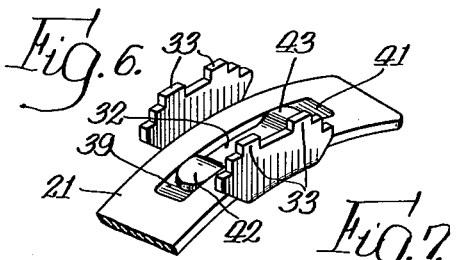
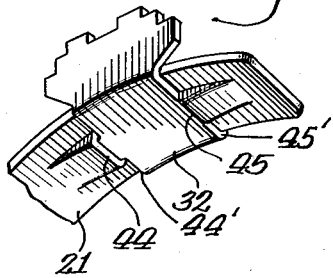
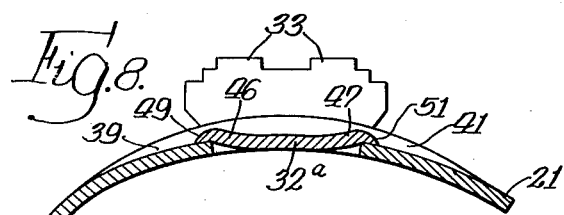
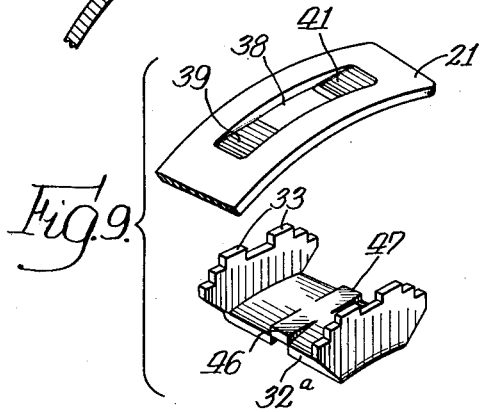
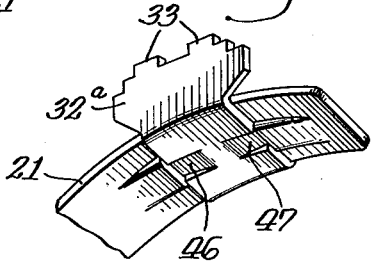
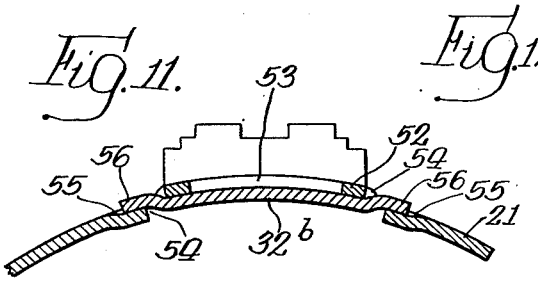
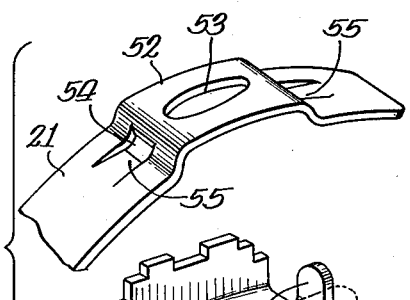

Patented Feb. 19, 1946

2,395,273

UNITED STATES PATENT OFFICE 2,395,273

HOSE CLAMP

Frank L. Hill and Keith A. Hill, Rockford, Ill.; said Keith A. Hill assignor to said Frank L. Hill Application August 17, 1944, Serial No. 549,835

6 Claims. (Cl. 24—19)

This invention relates generally to hose clamps for use in establishing leak-proof connections between hose and pipes or tubes projecting into the same. The present clamp is particularly efficient for clamping bullet-proof hose, the thick, relatively soft walls of which are difficult to clamp so as to produce a sealed non-leak joint. In order to make a tight and durable connection with hose of this character it is essential that the hose be peripherally clamped under an approximately uniform pressure throughout substantially the entire perimeter of the hose or otherwise the hose has a tendency to move or flow, as it were, toward the areas of least pressure with consequent production of leakage in those areas.

Our present invention constitutes an improvement upon the hose clamp disclosed in Patent No. 2,386,629, issued October 9, 1945. The tightening mechanism included in our present invention is that disclosed in said patent. Our improvement resides in the manner of connecting the saddle or base of the tightening mechanism housing to one end of the metal clamping band.

In the patent referred to, the saddle is spot welded to the band and we are aware that in commercial production the saddle has sometimes been attached to the band by means of rivets. Both the spot welding and the riveting methods, however, produce a connection which is liable to be deficient in strength, as the result of which failure of the clamp in service may be caused.

The primary purpose of our present invention is to provide a connection between the saddle and the clamping band, without the employment of welds or rivets, which will be strong, durable and reliable in service and will provide a continuous circumferential contact surface on the inside of the clamp without such unevenness as would result from overlapping, and without breaks or spaces in the contact such as would be occasioned by separation or spacing apart of neighboring parts of the saddle and clamping band.

Another object is to provide a clamp on which the machine work on the various parts may be completed before they are assembled, that is, the parts are so constructed that they may be assembled and interlocked together without any welding or riveting operation.

Another object is to provide the clamping band and the housing base or saddle with transversely disposed abutments adapted to abut each other and thereby absorb the strains imposed by the tightening operation and thus preclude movement of the housing longitudinally of the band.

A further object is to provide interengaging tangs and recesses on the saddle and band which will lock the parts together and ensure the maintenance of the alignment of the abutments to absorb the tightening strains.

Other purposes and inherent advantages of our invention should be appreciated as the same is better understood by reference to the following description when considered in connection with the accompanying drawings.

Referring to the drawings:

Fig. 1 is a perspective view of a hose clamp embodying our invention in use;

Fig. 2 is an enlarged sectional view taken medially along the tightening and holding screw;

Fig. 3 is a transverse sectional view on the line 3—3 of Fig. 2;

Fig. 4 is a plan view with the upper part of the housing removed and the screw broken away;

Fig. 5 is an exploded perspectvie view of one form of saddle base and the portion of the clamping band designed to be connected thereto;

Fig. 6 is a perspective view with the parts shown in Fig. 5 disposed in assembled relation;

Fig. 7 is a perspective view looking at the assembled band and saddle base from the inside of the band;

Fig. 8 is a fragmentary longitudinal sectional view of a modified form of my invention;

Fig. 9 is an exploded perspective view of the parts shown in assembled relation in Fig. 8;

Fig. 10 is a view similar to Fig. 7 showing the parts of Fig. 9 in assembled relation;

Fig. 11 is a fragmentary sectional view of still another form of my invention;

Fig. 12 is an exploded perspective view of a portion of the clamping band and the saddle base shown as assembled in Fig. 11.

Referring to the drawings more in detail, and at first more particularly to Figs. 1 to 7 inclusive, reference character 21 indicates generally the clamping band made of spring steel or other suitable material and adapted to embrace the periphery of a hose 22 and clamp it snugly around the pipe or tube 23 so as to produce a leak-proof joint between the tube and hose.

One end of the band 21 is anchored to the tightening mechanism in any one of a variety of hereinafter described manners, and the opposite end portion of the band is provided with transversely extending apertures 24 disposed at a slight inclination to the longitudinal axis of the band and providing straight line wearing and holding edges 25 at one side and curved edges 26 at the other side of each slot so as to receive and provide a maximum of wearing and holding surfaces for the threads 27 of a cylindrical tightening screw 28, as best shown in Fig. 2.

The holding and tightening screw 28 is journalled in the end walls 20 and 20' of the upper portion 29 of a housing 30 which is designed to receive the screw and to provide end thrust surfaces which hold the screw against longitudinal movement under a holding strain.

The screw may be provided with a head of suitable construction including a screw driver receiving kerf 31 to be turned in one direction to tighten the clamp, and in the opposite direction to loosen it.

The upper part 29 of the screw housing is secured to the base 32 of the housing, hereinafter referred to as the saddle, in any suitable manner to provide the requisite strength and rigidity of structure. For illustrative purposes the saddle is shown as provided with upwardly projecting tangs 33 adapted to be projected through correspondingly spaced openings 33' in the laterally extending portion 29' of the upper member 29, the projecting ends of the tangs 33 being then peened over or riveted down to securely connect the complementary portions of the housing into a rigid assembly in which the screw 28 is rotatably mounted. It may be noted that the end walls 20 and 20' of the housing are provided with slots 34 and 35, respectively, in which are disposed the reduced portions 36 and 37 of the screw 28. The bottoms of the slots hold the screw against movement away from the band, while the end walls at the sides of the slots prevent longitudinal movement of the screw relative to the housing.

The construction thus far described is substantially that of the patent previously referred to. The connection between the clamping band and the saddle or base of the screw housing, which our invention provides in lieu of the less satisfactory welding or riveting of the saddle to the band will now be described more in detail.

Referring to Figs. 2, 5, 6 and 7, it will be observed that the clamping band is provided near its inner end with a slot 38 at the ends of which the metal of the band is depressed to form tapered recesses 39 and 41 for the reception and accommodation of the holding tangs or locking means 42 and 43 respectively projecting from the edges of the base of the saddle 32. It will be observed from Fig. 5 that tang 42 is formed to project upwardly from the base of the saddle while tang 43 extends upwardly the thickness of the material forming the band 21 and thence outwardly. In assembling the saddle on the band in this form of the invention the tang 43 is inserted upwardly through the slot 38, the saddle is then moved toward the right, viewing Figs. 5 and 6 to dispose tang 43 in recess 41 whereupon tang 42 may be projected upwardly through slot 38 and then bent downwardly into recess 39, as shown in Fig. 6 to lock the parts in assembled relation. It will be apparent from the drawings that when the screw is tightened up to perform the clamping, thereby imposing a strain upon the band and saddle tending to move the saddle longitudinally of the band, such movement is resisted by engagement of the walls or abutments 44 and 45 of the recesses with the abutting side edges of the saddle base. No strain is imposed upon the tangs 42 and 43 tending to straighten them out so as to permit disconnection of the saddle from the band.

It will be understood that after the saddle and band have been assembled and locked together in the manner described, the upper part 29 of the housing, together with the screw, are assembled upon the saddle and securely fastened thereto by the peen-over of the upwardly projecting lugs or tangs 33.

In the form of the invention shown in Figs. 8, 9 and 10, the recesses 39 and 41 and the slot 38 are formed in the band 21 in a manner similar to that previously described. The saddle 32a, however, in this instance instead of having the tangs projecting outwardly from the base of the saddle, has a pair of tangs 46 and 47 formed by slitting the metal forming the base of the saddle. The saddle base in all forms of the invention is curved slightly lengthwise of the band to conform to the curvature of the hose to be clamped and when the material is slitted to form the tangs 46 and 47 these tangs are straightened so that the ends of the lower edges lie above the bottoms of the recesses 39 and 41. A suitably shaped tool forming in effect an anvil is then placed beneath the saddle against which the ends of the tangs 46 and 47 are peened and somewhat elongated as indicated by reference characters 49 and 51 of Fig. 8 to interlock with the bottom walls of the recesses 39 and 41, thereby locking the saddle to the band.

In the form of the invention shown in Figs. 11 and 12 the band 21 is arched outwardly as indicated at 52 and provided with elongated aperture 53 designed to accommodate the edges of the threads 27 which project through the openings 24 formed in the overlapping end of the band.

At each side of the arch 52 the band is cut and shaped to provide openings 54 and adjacent depressions 55 for the reception of tangs 56 formed integrally with the saddle. When the saddle 32b is formed these tangs project upwardly as illustrated in full lines in Fig. 12 so that the saddle may be positioned beneath and in contact with the arch portion 52 whereupon the tangs 56 are bent downwardly into the dotted line positions of Fig. 12 as illustrated in Fig. 6, thereby locking the band and saddle together. It will be apparent that the inner face of the saddle constitutes in effect an arcuate continuation of the inner face of the band, thereby providing a continuous binding surface against the perimeter of the hose being clamped.

It will be observed that in all of the forms of the invention illustrated and described the saddle and the clamping band are connected and securely locked together with the employment of welding or riveting.

Interengaging parts on the band and saddle serve not only to hold the parts against separation but also provide abutments which take the longitudinal strains incident to tightening of the clamp, and provide a strong, durable and rigid construction which will not be disrupted by but will be capable of resisting all strains to which the clamp may be subjected in use. Furthermore in each of the forms of the invention disclosed a substantially continuous curved surface is presented on the interior of the clamping engagement with the hose. The clamp will not therefore distort or collapse thin wall tubing and provides for uniform peripheral tightening as the screw draws the band through the housing.

The structural details illustrated and described may be modified within considerable limits without departing from the essence of the invention, as defined in the following claims.

We claim:

1. For use in a hose clamp having an encircling metal band, a housing mounted on the band adjacent to one end thereof, and a tightening screw rotatably mounted in the housing and adapted to engage with the free end of the band, a means interconnecting the housing and the band comprising abutments on the band extending transversely thereof and means on the band forming recesses adjacent to said abutments, the base of the housing having a shape corresponding thereto and providing transversely extending abutments in abutting relationship to the band abutments to prevent movement of the housing longitudinally of the band and locking means extending longitudinally of the band and disposed in said recesses to prevent separation of the housing from the band.

2. A joint between a metallic strap and a housing mounted thereon comprising a saddle member connected to the strap and a top member secured to the saddle member, said saddle portion and the band having opposed transversely disposed abutments preventing movement of the saddle longitudinally of the band, locking tangs on the saddle portion extending longitudinally of the band from transverse edges of the saddle engaging the outer surfaces of a portion of the band to prevent separation of the housing from the band.

3. A joint between a metal band and a housing comprising a saddle member connected to the band and a top member secured to the saddle member, said band being provided with transversely disposed abutments and with longitudinally extending tang receiving recesses, said saddle being provided with corresponding transversely disposed abutments and with tangs projecting longitudinally of the band and seated in said recesses.

4. A joint between a metal band and a housing mounted thereon comprising a saddle member connected to the band and a top portion secured to the saddle portion, cooperative abutments on the band and saddle member, means on the band forming a depressed tang receiving recess and a tang projecting beyond the confines of the saddle and engaged in said recess.

5. A joint between a metal band and a housing mounted thereon comprising transversely extending cooperating abutments on said housing and band, means on said band and housing respectively forming recesses consisting of depressions extending longitudinally of the band and tangs projecting into said recesses whereby the housing is secured on the band.

6. For use in a hose clamp having a metal band member and a housing member mounted thereon, means interconnecting the housing and the band comprising opposed transversely extending abutments on each of said members, means on one of the members forming at least one recess extending longitudinally of the band member, and means on the other member forming at least one tang projecting longitudinally of said band member, said tang being seated in said recess.

FRANK L. HILL.
KEITH A. HILL.